United States Patent [19]

Behn et al.

[11] Patent Number: 4,733,327
[45] Date of Patent: Mar. 22, 1988

[54] ELECTRICAL CAPACITOR

[75] Inventors: Reinhard Behn, Munich; Ferdinand Utner, Regensburg, both of Fed. Rep. of Germany

[73] Assignee: Siemens Aktiengesellschaft, Berlin and Munich, Fed. Rep. of Germany

[21] Appl. No.: 13,135

[22] Filed: Feb. 10, 1987

Related U.S. Application Data

[62] Division of Ser. No. 857,999, May 1, 1986, Pat. No. 4,667,382.

[30] Foreign Application Priority Data

May 13, 1985 [DE] Fed. Rep. of Germany ....... 3517243

[51] Int. Cl.$^4$ .............................................. H01G 4/30
[52] U.S. Cl. .................................. 361/306; 29/25.42; 361/309; 361/321
[58] Field of Search ............... 361/306, 321, 323, 308, 361/309, 310; 29/25.42; 242/56.1

[56] References Cited

U.S. PATENT DOCUMENTS 1,128,058  2/1915  Schoop .
3,444,436  5/1969  Coda .
3,651,548  3/1972  Behn .
3,670,378  .6/1972 Behn et al. .
3,728,765  4/1973  Behn et al. .
4,563,724  1/1986  Behn .

FOREIGN PATENT DOCUMENTS 1764541  10/1970  Fed. Rep. of Germany .
1940036  2/1971   Fed. Rep. of Germany .
2541111  3/1977   Fed. Rep. of Germany .
3342329  5/1985   Fed. Rep. of Germany .
2497393  2/1982   France .

Primary Examiner—Carl E. Hall
Attorney, Agent, or Firm—Hill, Van Santen, Steadman & Simpson

[57] ABSTRACT

An electrical capacitor and manufacturing method therefor includes protective cover layers each of which has an insulating strip on each of two projections. During manufacture, an apparatus which forms intermittent metal-free strips during the winding of the capacitor is switched to continuous operation for the windings of the cover layers so that continuous metal-free strips are formed.

5 Claims, 3 Drawing Figures

ELECTRICAL CAPACITOR

This is a division of application Ser. No. 857,999 filed May 1, 1986 now U.S. Pat. No. 4,667,382.

BACKGROUND OF THE INVENTION

1. Field of the Invention

The present invention relates generally to an electrical capacitor formed of a consolidated stack of dielectric layers, each layer having a metal antipolar coating, and further to a method for the manufacture of such capacitor.

An electrical capacitor is disclosed in U.S. Pat. No. 4,563,724 that is formed of a consolidated stack of dielectric layers laminated to one another, each dielectric layer being provided with a metal coating layer. The metal coatings on alternate layers extend to alternate ones of two projections. The projections are formed in the consolidated stack by an incision roughly in the center of one side of the stack and proceeding in the direction of the thickness of the stack. The end surfaces of the projections are provided with metal contact layers which contact and connect the metal coatings to one another to form anti-polar coatings of the electrical capacitor.

Additional features of the disclosed capacitor include:

(a) the dielectric layers are composed of plastic films;

(b) the coatings are composed of regenerably thin layers of valve metal. Each coating covers a respective surface of a dielectric layer practically up to the edges at the long sides of the consolidated stack, as well as up to both ends of the projections. In some embodiments, the metal coatings extend up to the edge of an upper narrow side of the stack which lies opposite the stack side containing the incision;

(c) alternating from dielectric layer to dielectric layer, the projections are provided with metal-free insulating strips which form remaining metal strips at the ends of the projections. The incision is at least greater than the width of the remaining metal strips, and preferably coincides with or extends beyond the inner edges of the insulating strips;

(d) the metal contacts connecting the antipolar coatings to one another are produced by metal spraying;

(e) at least one capacitively ineffective cover layer is provided at a front side and/or a back side of the stack.

A method is also disclosed in the U.S. Pat. No. 4,563,724 for manufacturing the disclosed electrical capacitors. The method includes stacking, or winding, on a drum bands of plastic which are metallized on one side so that a master capacitor is formed. The bands include a wavy cut at one edge side. The resulting master capacitor is divided perpendicularly to the layer planes into individual capacitors.

The disclosed method also includes arranging capacitively ineffective intermediate layers on a plurality of dielectric layers having metal coatings to form a parent capacitor and further arranging capacitively effective dielectric layers with metal coatings thereover for a next parent capacitor. The master capacitor is thereby formed of a plurality of parent capacitors, and is subsequently provided with end contact layers. The master capacitor is divided in the region of the intermediate layers and in a direction perpendicular thereto. The method steps include the following:

(a) two metallized bands are wound onto a drum, each band having a metal-free strip at one edge and intermittent metal-free insulating strips in the region of an opposite edge and spaced therefrom. The intermittent metal-free strips are produced in the winding direction before or during winding such that, as the bands are wound onto the drum, the insulating strips lie in a plane perpendicular to the winding axis, corresponding to the drum shaft. Each end of the intermittent insulating strips extend into or slightly beyond a region into which an incision is later made;

(b) during winding, the bands are conducted onto the drum such that the centers of the intermittent insulating strips of an upper one of the bands are symmetrically arranged above the centers of the spaces between the intermittent insulating strips of a lower one of the bands to generate a parent capacitor;

(c) after winding and consolidation of the master capacitor, or respectively, a parent capacitor, at least one end face formed by the edges of the bands is provided with a metal layer by metal spraying while still on the drum;

(d) after division into individual parent capacitors, incisions are generated perpendicular to the winding direction centrally between two respective cut lines so that two projections are formed as a result of the width and depth of the incisions;

(e) severing the individual capacitors—after, depending upon the embodiment, fastening the power leads—by sawing along the cut lines which proceed through the centers of the intermittent insulating strips; and (f) finishing the individual capacitors by applying power leads, such as cap-shaped power leads, insofar as power leads have not already been secured in step e).

Another method for manufacturing the electrical capacitors provides that bands of plastic which are metallized at one side are stacked on a drum as dielectric layers to form a master capacitor, the bands having a wavy cut at one edge. The master capacitor is divided into the desired individual capacitors perpendicular to the layer planes and capacitively ineffective intermediate layers are arranged over a plurality of the dielectric layers having coatings to form a parent capacitor. The next parent capacitor is formed by arranging capacitively effective dielectric layers having coatings over the capacitively ineffective intermediate layers. An original capacitor is thereby formed and is provided with end contact layers and subsequently divided in the region of the intermediate layers and in a direction perpendicular thereto. The disclosed method includes the following steps:

(a) metallized bands are wound onto a drum. The metallized bands are provided with intermittent metal-free insulating strips in the winding direction in the region of and spaced from both band edges. The intermittent metal-free strips are provided either before or during winding such that, when the bands are wound onto the drum, the insulating strips are wound in a plane perpendicular to the winding axis. Each end of the intermittent strips extend into or goes slightly beyond a region in which an incision is subsequently formed;

(b) during winding onto the drum, the bands are conducted such that the centers of the insulating strips of an upper band are symmetrically arranged over the centers of the spaces between the insulating strips of a lower band in the finished parent capacitor;

(c) after winding and consolidation of the master capacitor, or respectively, parent capacitor, applying metal layers to both end faces formed by the edges by metal spraying while still on the drum;

(d) after separation into individual parent capacitors, generating incisions at both sides perpendicular to the winding direction in the center between two respective cut lines so that two projections are formed by the width and depth of the incisions;

(e) severing the individual capacitors, possibly after fastening power leads thereto, by sawing along cut lines which proceed through the centers of the intermittent insulating strips, as well as sawing along a cut line which lies in the center of the parent capacitor parallel to the edges; and (f) finishing the capacitors by applying power leads, such as cap-shaped power leads, insofar as power leads have not been already applied in method step (e).

The disclosed capacitors contain capacitively ineffective cover layers as insulation above the first dielectric layer and below the last dielectric layer. The cover layers are applied in the manufacturing operation in the form of plastic films without metal coatings, so that the cover layers of the finished capacitor do not have metal coatings. See German Pat. No. 1,764,541, corresponding to U.S. Pat. Nos. 3,670,378 and 3,728,765.

German Pat. No. 25 41 111 discloses a method for manufacturing electrical capacitors formed of stacks. According to this method, a plurality of parent capacitors separated from one another by capacitively ineffective intermediate layers are wound onto a large-diameter drum. One or more capacitor foils having successive metal layers to form the two antipolar coatings are wound laterally offset relative to one another so that they alternately extend up to one of the two end faces of the winding and are thus spaced from the other end face of the winding. A parting band which projects beyond the end faces of the capacitor at both sides is wound threaded in the middle of the intermediate layers. A master capacitor which is thus formed has metal contacts applied over both full end faces by the schoopage method. The capacitor is then tempered for mechanical solidification and parted, or separated, in at least one plane which proceeds through the rotational axis of the winding. The parent capacitors, or subsections of parent capacitors, which are formed are parted along the parting band and then divided into individual capacitors by further cuts perpendicular to the running direction of the foil band.

In the region of the intermediate layers the capacitor foils are provided with metal-free longitudinal strips in the metal layers so that the individual capacitors have no capacitively effective coverages in the region of the intermediate layers after a parent winding has been parted. The metal-free longitudinal strips are generated, for example, by electrical discharge machining, erosion by radio frequency or pulses which are supplied by rolling wheels or dragging metal tapes, or are generated by mechanical abrasion such as rotating abrasive wheels. The metal-free strips are preferably generated as close as possible to the winding machine such as, for example, on a deflection roller close to the winding drum if producing the metal-free strips directly on the drum is not possible.

The method provides plastic bands with metal coatings on one side, wherein the metal coatings from plastic band to plastic band alternatingly extend up to opposite ones of the edges. A metal-free strip is provided at the other opposite edge of each plastic band as a result of the metal coating being spaced from the edge. The metal-free longitudinal strip is additionally generated in the proximity of that edge up to which the metal layer extends so that when the end faces of the master capacitor are later connected, the metal coating layer along which the longitudinal strip extends is not connected to the metallized end face. Thus, this plastic layer acts as a cover layer.

The electrical layer capacitor which is the subject of the above-cited U.S. Pat. No. 4,563,724 is constructed, based on the overall structure and manufacturing method, in a completely different way from capacitors resulting from the method of German Pat. No. 25 41 111.

The U.S. Pat. No. 4,563,724 also discloses that the manufacture of intermittent metal-free insulating strips on the metallized tapes can be undertaken through the use of laser beams. Pulses of the laser beam are controlled so that they are synchronized with the rotation of the drum to achieve the desired position and length of the insulating strips relative to one another and also relative to the build up of the parent capacitor as its radius increases.

German Patent Application No. P35 14 824 discloses a particular embodiment for the manufacture of metal-free strips by a laser.

SUMMARY OF THE PRESENT INVENTION

An object of the present invention is to provide effective protection for an electrical capacitor from atmospheric and mechanical stresses, and further, to provide an improved shielding from interfering emissions, with capacitively ineffective cover layers.

It is a further object of the present invention to provide a method for particularly simple manufacturing of capacitor cover layers. These and other objects are achieved in the present invention which is embodied in an electrical capacitor of the type initially described that is further characterized by at least one of the cover layers on the lower and/or upper side of the consolidated stack being fashioned as a cover layer composed of the same plastic as the dielectric layers and being provided with a metal coating layer that includes metal-free insulating strips at both projections to separate the metal coating layer from the metal contacts that provide electrical connections between the coating layers.

A method according to the present invention is characterized in that the capacitively ineffective intermediate layers which are applied to a plurality of coated dielectric layers to form a parent capacitor and which form the cover layers in the finished master capacitor are formed of the coated dielectric layers. No additional special plastic bands need be wound in. The capacitively ineffective layers are generated by the same apparatus as is used for forming the intermittent, metal-free insulating strips. The apparatus is switched to continuous operation and continuous insulating strips are thereby formed in the region and spaced from the edges of the metallized tapes, or bands, until a plurality of intermediate layers corresponding to the desired number of cover layers, have been wound onto the drum. Winding is continued until the desired plurality of windings for the cover layers of the next parent capacitor are wound, whereupon the strip forming apparatus is again changed to intermittent operation so that capacitively effective dielectric areas with intermittent strips are again produced and are thus seamlessly wound onto the drum.

Furthermore, the method of the present invention is characterized by the capacitively ineffective intermediate layers being applied to a plurality of coated dielectric layers to form a parent capacitor, the cover layers in the finished master capacitor being formed of the metal coated dielectric tapes without winding additional special plastic bands thereon. The intermittent metal-free strip forming apparatus is switched to continuous operation for a duration to form insulating strips in the region of and spaced from both edges of the metallized dielectric tapes. A plurality of intermediate layers corresponding to the desired number of cover layers are wound onto the drum and a further plurality of windings for the cover layers of the next parent capacitor are wound thereon, after which the intermittent strips are again produced to seamlessly join capacitively effective dielectric layers therewith.

DESCRIPTION OF THE PREFERRED EMBODIMENTS

Figure 1:
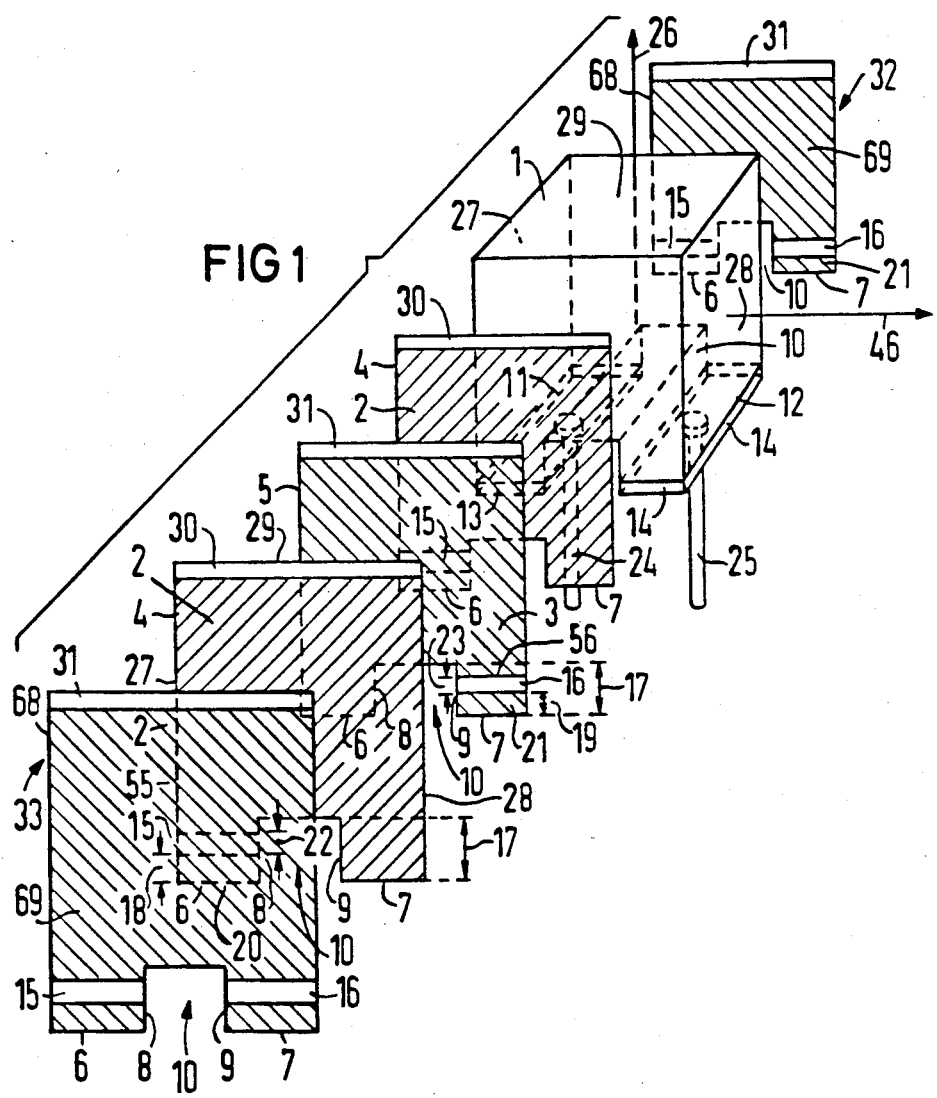
FIG. 1 is a partially exploded perspective view of a capacitor according to the principles of the present invention.

A laminated stack-type capacitor is shown in FIG. 1, partially exploded to reveal the first four and the last one of dielectric layers 4 and 5 which form a consolidated stack 1. The dielectric layers 4 and 5 include metallic coatings 2 and 3 which are applied thereto as thin metal layers of valve metal. The valve metal is preferably aluminum or zinc and extends up to two long sides 27 and 28 of the consolidated stack 1. The coatings 2 and 3 can also extend up to the upper narrow side, or top, 29; however, in the embodiment shown, the coatings 2 and 3 are spaced from the top 29 by metal-free strips 30 and 31.

First and second projections 8 and 9 are formed in a narrow side, or bottom, of the stack 1 opposite the top 29, the projection 8 and 9 having respective ends 6 and 7. The metal coatings 2 on the dielectric layers 4 extend up to the ends 7 of the projections 9, whereas the coatings 3 on the dielectric layers 5 extends up to the ends 6 of the projections 8. On alternating ones of the dielectric layers 4 and 5, metal-free insulating strips 15 and 16, respectively, are arranged on the respective projections 8 and 9. The metal-free insulating strips 15 and 16 are spaced from the ends 6 and 7, respectively, so that remaining metal strips 20 and 21, respectively, are formed.

The incision 10 which has created the projections 8 and 9 has a depth 17 which at least exceeds widths 18 and 19 of the remaining metal strips 20 and 21, respectively. The incision depth 17 preferably extends to inner edges 55 and 56 of the respective metal-free insulating strips 15 and 16, or may project somewhat beyond the inner edges 55 and 56. In other words, the depth 17 of the incision 10 is greater than the cumulative width 18 of the remaining metal strip 20 and a width 22 the metal-free insulating strip 15, or, respectively, the widths 19 and 23 of the remaining metal strip 21 and the metal-free insulating strip 16.

Metal contact layers 13 and 14 which are provided at the surfaces 11 and 12, respectively, formed by the ends 16 and 17 of the respective projections 8 and 9 must also be considered in determining the depth 17 of the incision 10. In one embodiment, power leads 24 and 25 are secured to the metal layers 13 and 14, respectively, proceeding in the direction of a longitudinal axis 26 of the consolidated stack 1. In other embodiments, such as those for integration of the capacitor as a chip, cap-shaped leads (not shown) can be secured to the metal contact layers 13 and 14.

Cover layers 68 are present at an under side 32 and at an upper side 33 of the consolidated stack 1. Although only one cover layer 68 is shown at each side 32 and 33, a plurality of such cover layers 68 may be included, depending on the need for guarantying adequate protection against the initiation of punchthroughs due to external damage or dirt. This can depend on the distance of the capacitively effective layers from the parting foil when metallizing the end faces of the master capacitor so that a faultless contacting of the capacitively effective layers is accomplished. This overcomes the problem of shadowing which arises due to a parting foil extending beyond the end face on the master capacitor.

Particularly advantageous when producing capacitors of low capacitance, the plurality of capacitively effective layers can be wound and subsequently a prescribed overall thickness or overall number of layers for the finished capacitor can be filled out by capacitively ineffective layers without requiring additional control operations.

Metal layers 69 are situated on the cover layer 68, such metal layers 69 not being electrically connected to the metal end contacts 13 and 14 as the consequence of the metal-free insulating strips 15 and 16 on the two projections 8 and 9, respectively.

Figure 2:
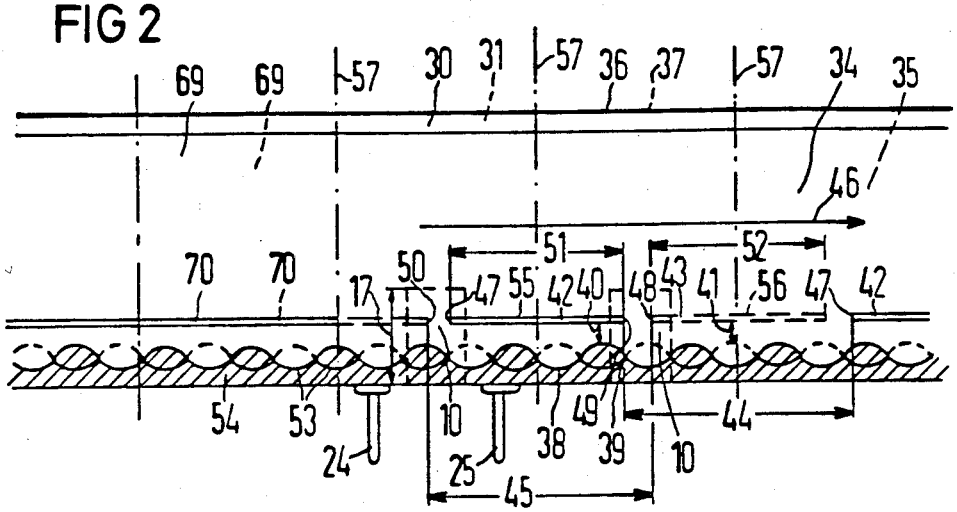
FIG. 2 is a plan view of the metallized dielectric layers as produced by a first embodiment of the method of the present invention.
Figure 3:
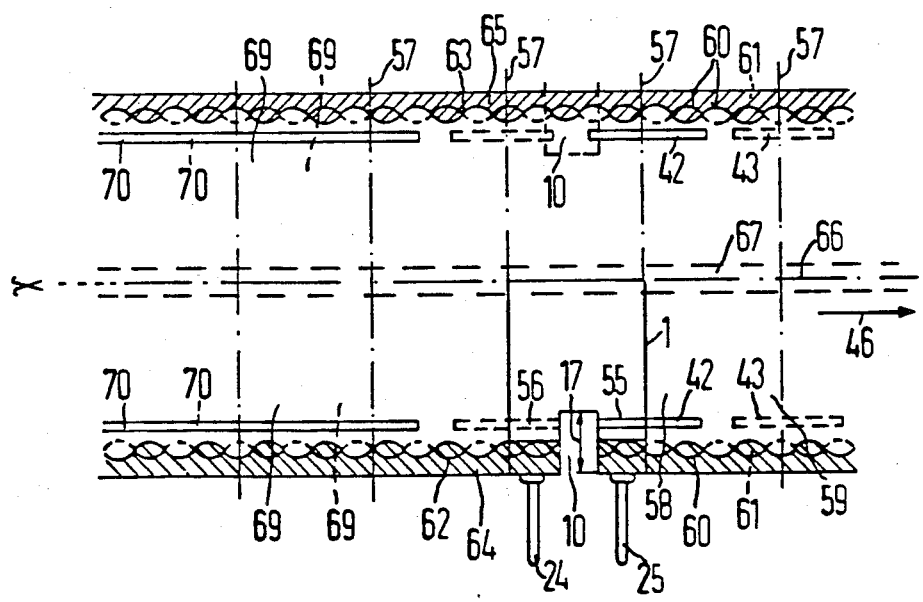
FIG. 3 is a plan view of the metallized dielectric layers as generated according to a second embodiment of the method of the present invention.

Referring to FIGS. 2 and 3, a method for manufacturing the above-described capacitors is also included in the present invention. Firstly, in FIG. 2 an upper metallized plastic band 34 and a lower metallized plastic band 35 are wound onto a drum (not shown) in a winding direction 46 to manufacture a parent capacitor or, respectively, a master capacitor. The metallized plastic bands 34 and 35 include metal-free insulating strips 30 and 31 at edges 36 and 37, respectively. One or both of the metallized plastic bands, or tapes, 34 and/or 35 are preferably provided with a wavy cut at edges 38 and/or 39, respectively, opposite the edges 36 and 37. The wavy cut serves the purpose of providing a planar plain contact surface between the metallized coatings of the plastic bands 34 and 35 and a metal contact layer 54 applied by metal spraying to an end face 53 of the master capacitor.

Metal-free insulating strips 42 and 43 are produced in the metallized coatings on the bands 34 and 35, respectively, before or at the latest during winding of the bands 34 and 35 onto the drum. The insulating strips 42 and 43 are intermittent in the winding direction 46 and are produced in the regions of edges 38 and 39 spaced by distances 40 and 41, respectively, therefrom. The insulating strips 42 and 43 are preferably produced having clearances 44 and 45, respectively, between ends 47 and 48 and beginnings 49 and 50 which are larger than lengths 51 and 52 of the respective insulating strips 42 and 43.

As the bands 34 and 35 are wound onto the drum, they are conducted such that the insulating strips 42 of the upper band 34 are disposed substantially in the center of the clearances 45 between the insulating strips 43 of the lower band 35.

After winding and consolidation of the master capacitor or, respective, the parent capacitors, a metal contact layer 54 is provided at an end face 53 formed by the edges 38 and 39. The metal contact layer 54 is produced by metal spraying while the master capacitor, or parent capacitors, are still on the drum. The metal spraying, in one example, is in accordance with the schoopage method disclosed in U.S. Pat. No. 1,128,058.

The master capacitor is separated into individual parent capacitors and incisions 10 are produced perpendicular to the winding direction 46 between two cut lines 57. The width of each incision 10 is preferably greater than the distance between the ends 47 of the upper insulating strip 42 and the beginning 50 of the lower insulating strip 43. The depth 17 of each incision 10 preferably extends up to and/or beyond the upper edges 55 and 56 of the insulating strips 42 and 43, respectively. It is possible to adjust the depth 17 of the incision 10 to balance, or match, the capacitance of the capacitor to a desired narrowly tolerated value. Alternately, the incisions 10 can be generated after the individual stacks 1 of the parent capacitors have been separated, as well.

The leads 24 and 25 can now be secured to the parent capacitor. Alternately, it is also possible to sever the individual capacitors first by sawing along the cut lines 57 which proceed through the centers of the insulating strips 42 and 43 and then to apply the leads 24 and 25. When cap-shaped leads are used, the application thereof subsequent to severing the parent capacitor into individual capacitors is recommended.

As soon as the number of windings as needed for a parent capacitor has been wound onto the drum, the production of the intermittent insulating strips 42 and 43 is ended and a continuous insulating strip 70 is generated as an extension of the insulating strips 42 and 43 on both bands 34 and 35. Alternately, the continuous insulating strip 70 may be generated on only one of the two bands 34 and 35. The continuous insulating strip 70 separates and insulates the metallized coatings on the bands 34 and 35 from the respective edges 38 and 39 so that a metal layer 69 arises on one, and preferably both, of the bands 34 and 35.

The production of one or both of the insulating strips 70 is continued until the desired plurality of windings is on the parent capacitor. When a number of parent capacitors are to be wound on the drum to form a master capacitor, a parting layer is wound onto these windings for at least one revolution of the drum, the windings with the continuous insulating strips 70 later forming cover layers. The production of the continuous insulating strip 70 is then resumed and a corresponding plurality of windings is again applied to form an under side of the next parent capacitor. Subsequent thereto, the production of the intermittent insulating strips 42 and 43 is resumed so that the next parent capacitor can be formed.

Referring to FIG. 3, a method is shown which differs from the method set forth in conjunction with FIG. 2. Metallized bands 58 and 59 are wound with one another in a winding direction 46 on the drum (not shown). The upper metallized band 58 includes wavy cut edges at both opposite edges 60 and/or 61, and for some embodiments, the lower metallized band 59 may have wavy cut edges as well. During or shortly after winding, the intermittent metal-free strips 42 on the upper band 58 and the metal-free strips 43 on the lower band 59 are produced in the region of both edges. Like the method disclosed in conjunction with FIG. 2, many of the same details apply, including; the intervals of the metal-free strips from the edges, the spacing of the metal-free strips from one another, and the guidance of the metallized bands during winding onto the drum.

Continuous metal-free strips 70 are produced at both edges to form a metal layer 69 insulated from the edges 60 and 61, in much the same way as disclosed above. After a parent capacitor, or master capacitor composed of a plurality of parent capacitors, has been produced, metal layers 64 and 65 are sprayed by a shoopage process onto the end faces 62 and 63 formed by the edges 60 and 61.

The bands 58 and 59 have a width corresponding to the height of two capacitors so that not only are the parent capacitors divided along lines 57, but they are also divided along a center cut line 66, as well. The division of the parent capacitors into individual capacitors may be carried out either before or after production of the incisions 10. For some embodiments, a metal-free strip 67 is disposed extending along a mid-line of the bands 58 and 59 so that metal-free strips 30 and 31 along the to of the finished capacitor stack 1 are formed.

The present invention provides the advantage of a capacitor having a desired plurality of capacitively ineffective cover layers which can be manufactured in a particularly simple way and practically without interruption of the winding process for appropriately controlled production of the metal-free strips. The capacitors produced by the method of the present invention are mechanically stable, resistant to atmospheric influences at the surfaces covered by the cover layers, and are shielded from interfering emissions.

Although modifications and changes may be suggested by those skilled in the art, it is the intention of the inventors to embody within the patent warranted hereon all changes and modifications as reasonably and properly come within the scope of our contribution to the art.

I claim:
1. An electrical capacitor, comprising:
a consolidated stack;
dielectric layers of plastic film laminated to one another to form said consolidated stack;
a metal coating layer on each of said dielectric layers, said metal layer being a regenerably thin layer of valve metal;
first and second projections formed by an incision in the direction of the thickness of said consolidated stack, said incision being substantially in the center of one narrow side of said consolidated stack;
said metal layers on alternate ones of said dielectric layers extending to the ends of alternate ones of said first and second projections, said metal layers covering a surface of each of said dielectric layers substantially to opposing long side edges corresponding to long sides of said consolidated stack, said metal layers defining metal-free strips on alternating ones of said dielectric layers to form remaining metal strips on said first and second projections;
said incision having a depth at least greater than the width of said remaining metal strips;

metal contacts formed on the end surfaces of said first and second projections by metal spraying, said metal contacts contacting said metal layers to connect said metal layers to one another and form antipolar coatings of said capacitor;

at least one cover layer on at least one of an upper and a lower side of said consolidated stack, said at least one cover layer being a capacitively ineffective cover layer of the same plastic film as said dielectric layers, said at least one cover layer being provided with a metal layer that defines metal-free insulating strips on both of said first and second projections to separate said metal layer from said metal contacts.

2. An electrical capacitor as claimed in claim 1, wherein said metal layers extend up to an edge side opposite said narrow one side having said incision.

3. An electrical capacitor as claimed in claim 1, wherein said metal layers are spaced from an edge side opposite said narrow one side having said incision.

4. An electrical capacitor as claimed in claim 1, wherein the depth of said incision coincides with the width of said remaining metal strips combined with the width of said metal-free strips.

5. An electrical capacitor as claimed in claim 1, wherein the depth of said incision is greater than the width of said remaining metal strips combined with the width of said metal-free strips.

* * * * *